UNITED STATES PATENT OFFICE.

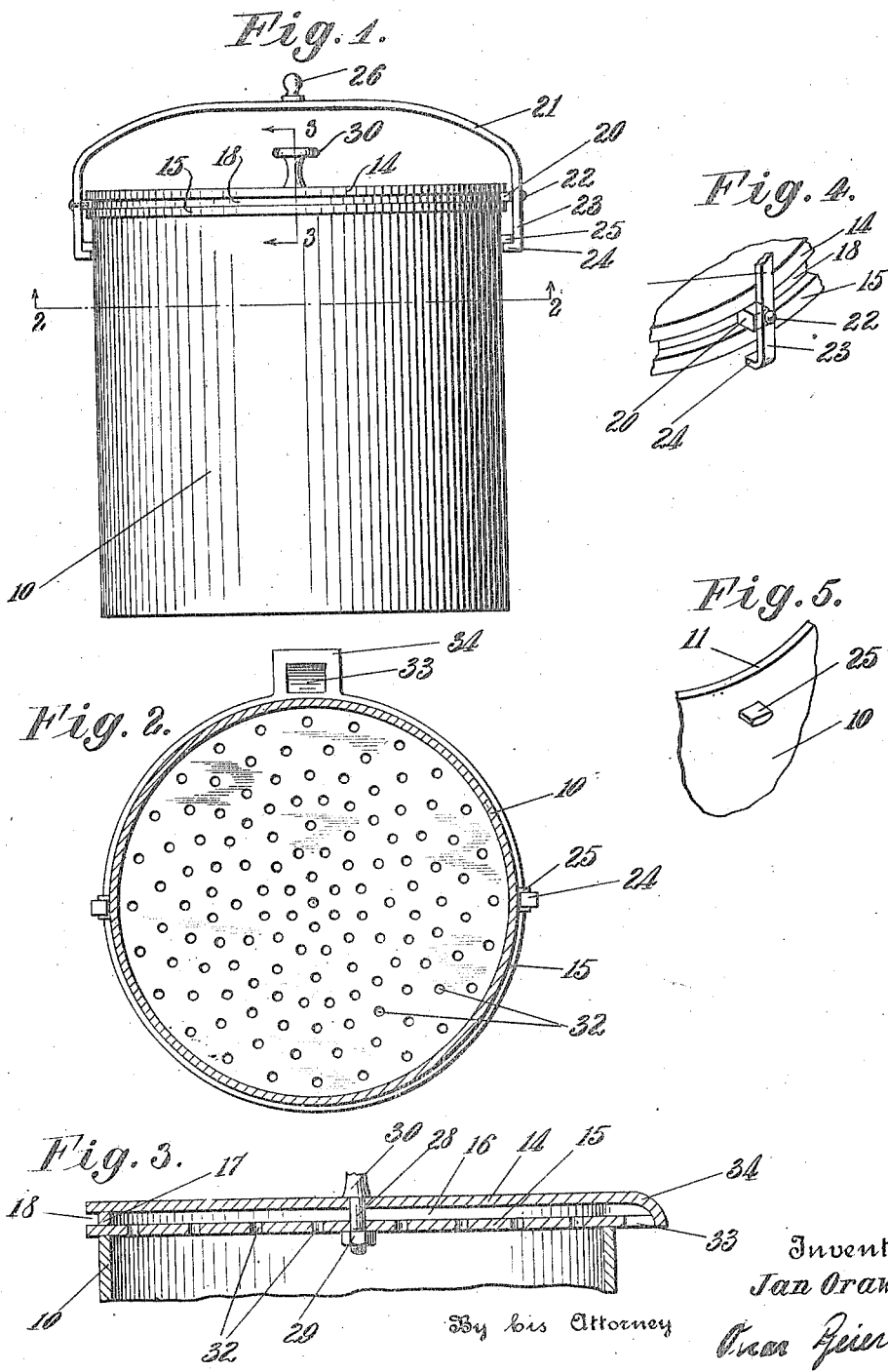

JAN ORAWIEC, OF NEW SALEM, PENNSYLVANIA.

COOKING VESSEL.

1,294,942.                    Specification of Letters Patent.        Patented Feb. 18, 1919.

Application filed July 1, 1918. Serial No. 242,844.

*To all whom it may concern:*

Be it known that I, JAN ORAWIEC, a citizen of Poland, residing at New Salem, county of Fayette, and State of Pennsylvania, have invented certain new and useful Improvements in Cooking Vessels, of which the following is a specification.

This invention relates to improvements in cooking vessels, and particularly to types known as boilers.

The principal object of the invention is to provide means for securing a cover firmly to the vessel so that the same may be handled as a unit.

A further object is to provide means for collecting steam and gases that arise from the material cooked within the vessel and conducting the same outwardly at one local point where they may be received in a suitable receptacle.

These and other like objects are attained by the novel construction and combination of parts hereinafter described and shown in the accompanying drawing, forming a material part of this disclosure, and in which:—

Figure 1 is a side elevational view showing a cooking vessel made in accordance with the invention.

Fig. 2 is a transverse sectional view taken on line 2—2 of Fig. 1.

Fig. 3 is an enlarged fragmentary vertical sectional view taken on line 3—3 of Fig. 1.

Fig. 4 is an enlarged fragmentary perspective view, showing the cover securing means, and Fig. 5 is a similar perspective view showing another portion of the cover securing means.

In the drawings, the numeral 10 designates the vessel, here shown to be of cylindrical construction, provided with an imperforate bottom (not shown) and a level open top 11. The cover is formed of two spaced plates, respectively 14 and 15, having between them a chamber 16, bounded by the connecting ring or band 17, which forms the side walls of the cover, the band or ring being of lesser diameter than that of the cover plates, presenting an annular outer space 18, receptive of clamp blocks 20, freely slidable therein, which are held pivotally to the bail 21 by screws, pins or like fastenings 22, so that the blocks may turn angularly with relation to the bail.

The extending lower ends 23 of the bail have inturned hooks 24 engageable with rigid projecting lugs 25, extending out upon opposite sides of the vessel 10, the projections having curved lower surfaces so as to permit the hooks 24, when operated by the extending central handle 26, to pass under the projections, which obviously will cause the clamp blocks 20 to depress the cover, holding it securely upon the upper surface of the vessel.

These cover plates are held together by a bolt 28 passing through each of the plates and secured by a nut 29, the stem of the bolt being enlarged into an operating knob 30 by which the cover can ordinarily be manipulated when the bail is in such position as to allow it.

Formed through the lower plate 15 are a plurality of perforations 32, which permit the steam emanating from the substances within the boiler or vessel to rise into the chamber 16, from which it escapes in a condensed form through an opening 33 formed in the lower plate 15, the same being covered by an overhanging element 34, formed with the upper plate 14, the drain opening 33 extending outward to such distance that a receptacle may be placed below to receive the drippings which may arise from condensation of vapors entering the chamber through the perforations 32.

From the foregoing it will be seen that a vessel suitable for cooking purposes has been described in which the steam and vapors arising may be prevented from being dissipated freely into the atmosphere and that the cover may be securely clamped in position in a novel and convenient manner.

The operations and use of the invention is believed to be obvious from the foregoing.

Having thus described my invention what I claim as new and desire to secure by Letters Patent, is.

1. In a cooking vessel, the combination with a hollow cylindrical body and a recessed cover suited thereto, a pair of lugs extending out from said body upon opposite sides thereof, a bail having inturned hook-like elements engageable with said lugs, and a pair of blocks pivotally engaged on said bail, said blocks being adapted to engage within said recess whereby said cover may be clamped in position on said body.

2. In a cooking vessel, the combination with a hollow cylindrical body having a level open top and a recessed cover suited to engage thereover, rigid lugs extending outward from the walls of said body upon opposite sides, a bail having hook ends contactable with said lugs, clamp blocks engageable within said recess, and means for pivotally attaching said blocks to said bail whereby said cover may be clamped in position.

In testimony whereof I have affixed my signature.

JAN ORAWIEC.